US011718015B2

(12) United States Patent
Takenaka

(10) Patent No.: US 11,718,015 B2
(45) Date of Patent: Aug. 8, 2023

(54) STRAND AND MODELED OBJECT

(71) Applicant: KOBE STEEL, LTD., Hyogo (JP)

(72) Inventor: Makoto Takenaka, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 232 days.

(21) Appl. No.: 17/135,763

(22) Filed: Dec. 28, 2020

(65) Prior Publication Data

US 2021/0237339 A1 Aug. 5, 2021

(30) Foreign Application Priority Data

Feb. 5, 2020 (JP) ................................ 2020-018263

(51) Int. Cl.
| | |
|---|---|
| *B29C 64/106* | (2017.01) |
| *B33Y 70/00* | (2020.01) |
| *C08J 5/04* | (2006.01) |
| *D02G 3/40* | (2006.01) |
| *B33Y 80/00* | (2015.01) |

(52) U.S. Cl.
CPC ............ *B29C 64/106* (2017.08); *B33Y 70/00* (2014.12); *C08J 5/042* (2013.01); *D02G 3/404* (2013.01); *B33Y 80/00* (2014.12); *C08J 2323/12* (2013.01); *D10B 2101/08* (2013.01); *Y10T 428/2922* (2015.01)

(58) Field of Classification Search
CPC .. C08J 5/24; C08L 77/06; C08L 79/08; C08K 13/06; C08K 9/00; C08K 9/02; C08K 9/04; C08K 7/06; C08K 3/34; D06M 11/56; D06M 11/45; D06M 15/248; D06M 10/02; D06M 101/40

USPC ..... 57/7, 200, 240, 244, 250, 251, 258, 292, 57/296, 297; 428/298.1, 295.4, 297.4, 428/299.1, 299.4, 299.7, 370, 371, 364, 428/361, 375, 392, 394, 403
See application file for complete search history.

(56) References Cited

U.S. PATENT DOCUMENTS

| | | |
|---|---|---|
| 8,991,146 B2 | 3/2015 | Miura et al. |
| 2017/0210074 A1 | 7/2017 | Ueda et al. |

FOREIGN PATENT DOCUMENTS

| | | | |
|---|---|---|---|
| EP | 2653593 A1 | | 10/2013 |
| JP | 2006231922 | * | 9/2006 |
| JP | 2014-151458 A | | 8/2014 |

OTHER PUBLICATIONS

The extended European search report issued by the European Patent Office dated Jun. 29, 2021, which corresponds to European Patent Application No. 20217356.3-1017 and is related to U.S. Appl. No. 17/135,763.

* cited by examiner

*Primary Examiner* — Camie S Thompson
(74) *Attorney, Agent, or Firm* — Studebaker & Brackett PC

(57) ABSTRACT

Provided is a strand from which a modeled object with excellent impact strength can be easily formed by a 3D printer and a modeled object with excellent impact strength. A strand of the present disclosure is a strand used as a raw modeling material for a 3D printer, the strand including a base material containing thermoplastic resin as a main component and one or more fibers or fiber bundles impregnated in the base material and extending in an axial direction and the strand being twisted along the axial direction.

4 Claims, 1 Drawing Sheet

STRAND AND MODELED OBJECT

BACKGROUND OF THE INVENTION

Field of the Invention

The present disclosure relates to a strand and a modeled object.

Description of the Related Art

As a device configured to mold an object having a stereoscopic shape, a three-dimensional (3D) printer adopting fused deposition modeling for stacking resin in a thermally-plasticized state layer by layer has been known. This 3D printer can mold a three-dimensional shape without the need for a die, a jig, etc. In addition, an object in a three-dimensional shape difficult to be formed in a typical injection molding technique can be modeled.

As a modeling technique by such a 3D printer, the technique of separately using a first continuous material containing resin and a second continuous material containing fibers such as carbon fibers and supplying these materials from heads to form a molded object (a modeled object) reinforced by the fibers has been proposed (WO 2015/182675 A), for example.

In the technique of WO 2015/182675 A, two types of continuous materials need to be supplied, and for this reason, such a technique is far from simple modeling.

There is a probability that as use application of the 3D printer expands across a broad range, further mechanical strength is demanded for a three-dimensional structure (a modeled object).

The present disclosure has been made in view of such a situation, and an object of the present disclosure is to provide a strand from which a modeled object with excellent impact strength can be easily formed by a 3D printer and a modeled object with excellent impact strength.

As a result of intensive study for solving the above-described problem by the inventor(s) of the present invention, the following findings have been obtained.

That is, the inventor(s) of the present invention has considered that instead of the first continuous material and the second continuous material of WO 2015/182675 A, a continuous fiber made of an inorganic material such as a carbon fiber is, as a raw modeling material suitable for the 3D printer, impregnated in thermoplastic resin in a molten state. However, it has been found that the impregnated object obtained by such impregnation is rigid and is easily buckled, and for this reason, is far from exhibiting excellent handleability. For example, the impregnated object is easily bent upon winding up, and it is difficult to wind up the impregnated object.

As a result of further intensive study based on the above-described finding by the inventor(s) of the present invention, it has been found that a strand obtained in such a manner that a fiber is impregnated in thermoplastic resin in a molten state or is twisted while being impregnated in the thermoplastic resin in the molten state is less buckled and exhibits excellent handleability. In addition, particularly in the case of using multiple fibers or fiber bundles, it has been found that in an obtained strand, twisting after impregnation allows a thermoplastic resin component to be more distributed to a surface side than to a center side of the strand, reduces rupturing and breaking of the fibers, and increases friction among the fibers. Moreover, it has been found that when modeling is performed using such a strand by the 3D printer by fused deposition modeling, a modeled object has excellent impact strength due to contribution such as distribution of the thermoplastic resin component, reduction in fiber rupturing and breaking, and an increase in friction among the fibers. Eventually, the inventor(s) of the present invention has arrived at the present disclosure.

That is, the aspect of the disclosure made for solving the above-described problem is a strand used as a raw modeling material for a 3D printer, the strand including a base material containing thermoplastic resin as a main component and one or more fibers or fiber bundles impregnated in the base material and extending in an axial direction and the strand being twisted along the axial direction.

The fibers or the fiber bundles are impregnated in the base material, and the strand is twisted. Thus, the strand is less buckled, and exhibits excellent handleability. In addition, the strand is twisted, and therefore, a modeled object formed using the strand by the 3D printer has excellent impact strength. Thus, the modeled object with excellent impact strength can be easily formed from the strand by the 3D printer.

The number of times of twisting per meter in length in the axial direction is preferably equal to or greater than 10/m and equal to or less than 200/m.

As described above, the number of times of twisting is within the above-described range, and therefore, the strand is more reliably less buckled and exhibits better handleability. In addition, the modeled object formed using the strand by the 3D printer more reliably has excellent impact strength.

The angle of twisting with respect to the axial direction is preferably equal to or greater than 3° and equal to or less than 50°.

As described above, the angle of twisting is within the above-described range, and therefore, the strand is more reliably less buckled and exhibits better handleability. In addition, the modeled object formed using the strand by the 3D printer more reliably has excellent impact strength.

The fibers or the fiber bundles are preferably carbon fibers or carbon fiber bundles.

As described above, the fibers or the fiber bundles are the carbon fibers or the carbon fiber bundles, and therefore, the strand using the carbon fibers or the carbon fiber bundles as a relatively-rigid type among fiber materials is less buckled and exhibits excellent handleability. Thus, the superiority of the strand becomes higher. In addition, the carbon fibers or the carbon fiber bundles with relatively-high strength among fibers or fiber bundles is used, and therefore, the modeled object formed using the strand by the 3D printer has better impact strength.

Another aspect of the disclosure for solving the above-described problem is a modeled object formed by a 3D printer, the modeled object including a base containing thermoplastic resin as a main component and one or more fibers or fiber bundles contained in the base and twisted along an axial direction.

The modeled object is configured such that the fibers or the fiber bundles are contained in the base and are twisted, and therefore, has excellent impact strength.

The "main component" described herein means a component whose content is greatest, such as a component whose content is equal to or greater than 50% by mass.

As described above, according to the strand of the present disclosure, the modeled object with excellent impact strength can be easily formed by the 3D printer. The modeled object of the present disclosure has excellent impact strength.

DESCRIPTION OF THE PREFERRED EMBODIMENTS

Hereinafter, embodiments of a strand and a modeled object of the present disclosure will be described in detail. Note that in the present specification, one of multiple upper limits and one of multiple lower limits as described regarding an optional matter can be combined as necessary. By such combination, a numerical range between the combined upper and lower limits can be taken as being described as a numerical range suitable for the optional matter in the present specification. The numerical range between the upper and lower limits as described above includes a numerical range from the upper limit to the lower limit and a numerical range from the lower limit to the upper limit.

First Embodiment

First, a strand of the present embodiment will be described.

<Strand>

The strand is a strand used as a raw modeling material for a 3D printer. The strand includes a base material containing thermoplastic resin as a main component and one or more fibers or fiber bundles impregnated in the base material and extending in an axial direction, the strand being twisted along the axial direction. Hereinafter, the fibers or the fiber bundles will be also collectively referred to as a "fiber material." One configured such that one or more fibers or fiber bundles are impregnated in the base material will be also referred to as a "composite body."

Figure 1:
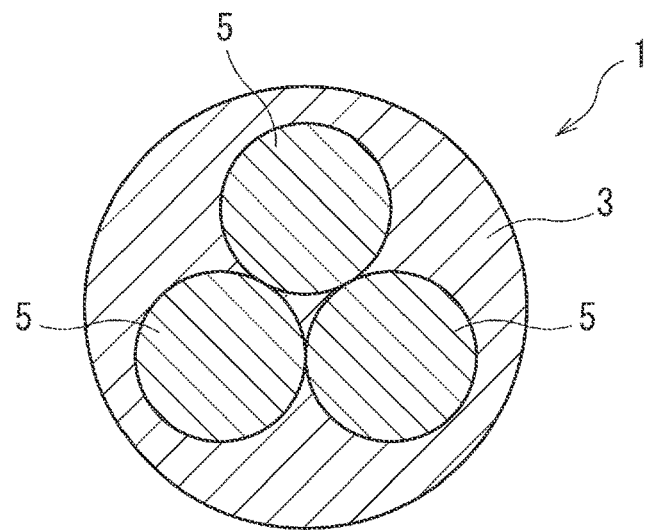
FIG. 1 is a schematic sectional view schematically illustrating a cross section of a strand of one embodiment of the present disclosure.

For example, in a form illustrated in FIG. 1, a strand 1 includes a base material 3 containing thermoplastic resin as a main component and multiple threads (three in FIG. 1) of a fiber material 5 impregnated in the base material 3 and extending in one direction (a direction perpendicular to the plane of paper of FIG. 1) as an axial direction, and is twisted along the axial direction. In addition to the form in which the strand 1 includes the multiple threads of the fiber material 5 as described above, a form in which the strand 1 includes one thread of the fiber material 5 may be adopted.

(3D Printer)

The 3D printer forms a three-dimensional modeled object by stacking the strand little by little after the thermoplastic resin component of the strand has been thermally molten, i.e., adopts fused deposition modeling. In such fused deposition modeling, modeling is performed layer by layer while a previously-formed layer and a subsequent layer are being bonded to each other in a semisolid (soft) state. The 3D printer is not specifically limited as long as the 3D printer can form the modeled object by stacking resin in a thermally-plasticized state little by little. Examples of the 3D printer include one including a support plate freely movable in upper-lower, right-left, and front-back directions and a supply unit configured to supply the thermoplastic resin component of the strand to the support plate while plasticizing the thermoplastic resin component.

(Base Material)

The base material contains the thermoplastic resin as the main component. The fibers or the fiber bundles can be impregnated in the base material in a molten state. The thermoplastic resin includes, for example, polyolefin-based resin such as polypropylene and polyethylene, polyamide-based resin such as nylon, polyester-based resin such as polyethylene terephthalate (PET) and polybutylene terephthalate (PBT), polyimide-based resin such as polyetherimide (PEI), polycarbonate-based resin, polyetheretherketone (PEEK), polyacetal, and polyphenylene sulfide.

The lower limit of the content (an impregnation amount) of the base material in the strand (100% by mass) is preferably 2% by mass and more preferably 5% by mass. When the content is less than the lower limit, there is a probability that the impact strength of the strand is degraded. On the other hand, the upper limit of the content is preferably 98% by mass and more preferably 95% by mass. When the content exceeds the upper limit, there is a probability that the handleability of the strand is degraded.

(Fiber or Fiber Bundle)

The strand includes one or more fibers or fiber bundles. That is, the strand includes one fiber, multiple fibers, one fiber bundle, or multiple fiber bundles.

The fiber is a long fiber, i.e., a continuous fiber. The average length of the fiber is not specifically limited as long as the average length is equal to or greater than 2 mm. The lower limit of the average length of the fiber is preferably 2 mm and more preferably 5 mm. On the other hand, the upper limit of the average length of the fiber is not specifically limited. The upper limit can be set as necessary to a length such as 1000 m or 500 m.

The fiber bundle is formed in such a manner that multiple fibers are bundled into a continuous linear shape. The average length of the fiber bundle is not specifically limited as long as the average length is equal to or greater than 2 mm. The lower limit of the average length of the fiber bundle is preferably 2 mm and more preferably 5 mm. On the other hand, the upper limit of the average length of the fiber bundle is not specifically limited. The upper limit can be set as necessary to a length such as 1000 m or 500 m.

The lower limit of the average diameter of the fiber is preferably 1 μm and more preferably 10 μm. When such an average diameter is less than the lower limit, there is a probability that it is difficult to form the strand and the modeled object with sufficiently-high impact strength. On the other hand, the upper limit of the average diameter is preferably 30 mm and more preferably 10 mm. When the average diameter exceeds the upper limit, there is a probability that it is difficult to bend the strand and form the modeled object.

The lower limit of the average thickness of the fiber bundle is preferably 500 tex, more preferably 1000 tex, and much more preferably 5000 tex. When such an average thickness is less than the lower limit, there is a probability that it is difficult to form the strand and the modeled object with sufficiently-high impact strength. On the other hand, the upper limit of the average thickness is preferably 100000 tex, more preferably 60000 tex, and much more preferably 40000 tex. When the average thickness exceeds the upper limit, there is a probability that it is difficult to bend the strand and form the modeled object.

Examples of the fiber include a carbon fiber, a glass fiber, organic synthetic resin such as aramid, and a metal fiber such as a steel wire. The carbon fiber is preferably used as the fiber. Examples of the fiber bundle include a carbon fiber bundle and a glass fiber bundle. The carbon fiber bundle is preferably used as the fiber bundle. The caron fiber described herein has relatively-high strength among fiber materials. Thus, the carbon fiber is used as the fiber or the caron fiber bundle is used as the fiber bundle, and therefore, the strand is less buckled and exhibits excellent handleability. Thus, the superiority of the strand becomes higher. In addition, the carbon fiber or the carbon fiber bundle with relatively-high strength among fibers is used, and therefore, the modeled object formed using the strand by the 3D printer has better impact strength.

(Twisting)

In the strand, the composite body configured such that the fiber material is impregnated in the base material is twisted in the axial direction. The lower limit of the number of times of twisting per meter in length in the axial direction is preferably 10/m, more preferably 20/m, much more preferably 50/m, and still much more preferably 70/m. When the number of times of twisting is less than the lower limit, there is a probability that the strand is easily buckled and exhibits poor handleability. In addition, there is a probability that the modeled object formed using the strand by the 3D printer has poor impact strength. On the other hand, the upper limit of the number of times of twisting is preferably 200/m, more preferably 150/m, and much more preferably 100/m. When the number of times of twisting exceeds the upper limit, there is a probability that the amount of the fiber material is relatively smaller than the amount of the resin material in manufacturing of the strand and the modeled object formed using the strand by the 3D printer has poor impact strength.

The angle of twisting with respect to the axial direction is determined according to the average thickness and average diameter of the fiber material and the number of times of twisting. The lower limit of the angle of twisting is, for example, preferably 3°, more preferably 10°, and much more preferably 15°. When the angle of twisting is less than the lower limit, there is a probability that the strand is easily buckled and exhibits poor handleability. In addition, there is a probability that the modeled object formed using the strand by the 3D printer has poor impact strength. On the other hand, the upper limit of the angle of twisting is preferably 50°, more preferably 35°, and much more preferably 25°. When the angle of twisting exceeds the upper limit, there is a probability that the amount of the fiber material is relatively smaller than the amount of the resin material and the modeled object formed using the strand by the 3D printer has poor impact strength.

Particularly, in a case where the strand includes the multiple fibers or one or more fiber bundles, the strand is twisted as described above so that the thermoplastic resin component in the strand can be more distributed to an outer surface side than to a center side of the strand. Thus, the impact strength of the modeled object can be more enhanced.

(Strand Manufacturing Method)

The method for manufacturing the strand of the present embodiment includes the step (the impregnation step) of impregnating the fibers or the fiber bundles in the base material in the molten state and the step (the twisting step) of bringing the impregnated fibers or fiber bundles into a twisted state. The manufacturing method can be performed using a manufacturing device 10 illustrated in FIG. 2, for example.

(Manufacturing Device)

Figure 2:
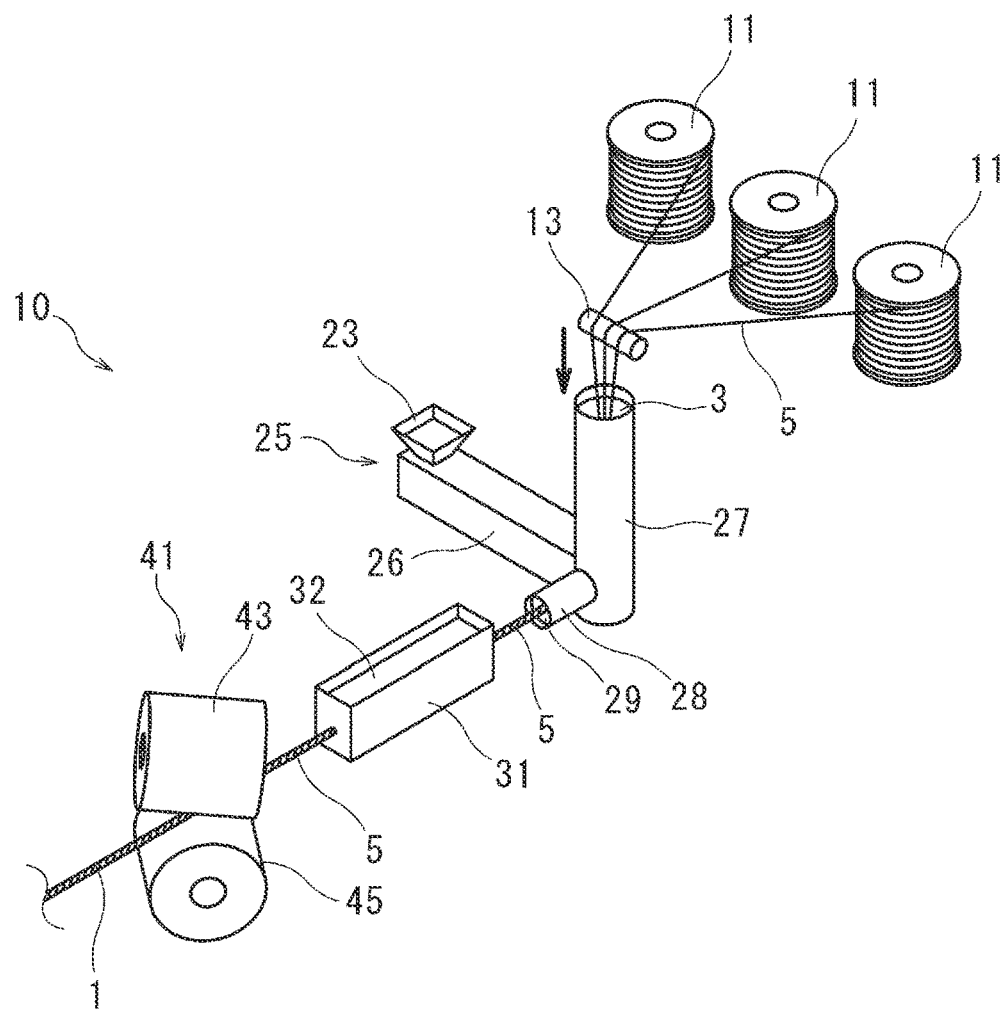
FIG. 2 is a schematic perspective view illustrating the device for manufacturing the strand of the present embodiment.

As illustrated in FIG. 2, the manufacturing device 10 includes multiple (three in FIG. 2) fiber material supply units 11 configured to send out the fiber material 5 wound in a coil shape at a predetermined speed, a kneading extrusion machine 25 configured to knead and melt the base material 3, and a resin bath unit 27 configured to impregnate the fiber material 5 sent out of the fiber material supply units 11 in the base material 3 plasticized by the kneading extrusion machine 25.

The manufacturing device 10 includes a cooling unit 31 arranged on a downstream side of the resin bath unit 27 and configured to cool the impregnated fiber material 5 sent out of the resin bath unit 27, and a twisting unit 41 arranged on a downstream side of the cooling unit 31 and configured to mainly twist the cooled fiber material 5 about the center thereof.

The kneading extrusion machine 25 rotatably includes a screw shaft (not shown) having a kneading blade in a chamber 26 having a cavity inside, and melts and plasticizes the base material 3 injected through a hopper 23.

The resin bath unit 27 is formed in such a cylindrical shape that a cylinder axis direction is along the upper-lower direction, and the base material 3 plasticized by the kneading extrusion machine 25 is supplied into and stored in such a cylinder. An upper end portion of the resin bath unit 27 opens so that the fiber material 5 can be drawn into the base material 3 stored in the resin bath unit 27 through such an upper end opening.

Although not shown in the figure, multiple (e.g., four) impregnation rolls rotatably held such that the centers thereof are in the horizontal direction are provided in parallel with each other at predetermined intervals in the upper-lower direction in the resin bath unit 27. The fiber material 5 introduced through the upper end opening of the resin bath unit 27 is sequentially bridged over these impregnation rolls to meander downwardly. The fiber material 5 is twisted at least on a downstream side with respect to the lowermost one of these multiple impregnation rolls.

An outlet 28 for drawing out the impregnated fiber material 5 is provided at a lower end portion of the resin bath unit 27. A die 29 for shaping the base material 3 covering the fiber material 5 to form a sectional shape is provided at the outlet 28.

The cooling unit 31 is a water tank formed long along a direction in which the impregnated fiber material 5 is drawn out of the resin bath unit 27, and stores cooling water 32 in the tank. An inlet for introducing the impregnated fiber material 5 is provided at a tank wall facing closest to the outlet 28 (the die 29) of the resin bath unit 27, and an outlet for discharging the impregnated fiber material 5 is provided at a tank wall farthest from the inlet. Thus, in the cooling unit 31, the base material 3 in which the fiber material 5 is impregnated and which covers the fiber material 5 can be cooled with the cooling water 32 and can be hardened.

Various mechanisms can be adopted as the twisting unit 41 arranged on the downstream side of the cooling unit 31. For example, although not shown in the figure, a mechanism configured to rotate, about the center of the strand 1, a bobbin configured to wind up the strand 1 may be adopted as the twisting unit 41. As illustrated in FIG. 2, a configuration having a pair of an upper draw-off roll 43 and a lower draw-off roll 45 contacting each other at outer peripheral surfaces thereof may be adopted as the twisting unit 41, for example. The draw-off roll 43 and the draw-off roll 45 are rotatable in different rotation directions to send the impregnated fiber material 5, which has been sent out of the cooling unit 31, to a further downstream side with the fiber material 5 being sandwiched between the opposing draw-off rolls 43, 45.

That is, the pair of upper and lower draw-off rolls 43, 45 included in the twisting unit 41 has the function of drawing the fiber material 5 into the resin bath unit 27 from the fiber material supply units 11 and drawing the impregnated fiber material 5 out of the resin bath unit 27 to the cooling unit 31 and the twisting unit 41, and in the manufacturing device 10, forms a draw-off unit for the fiber material 5 and the strand 1. Note that a wind-up unit (not shown) may be separately provided on a downstream side of the twisting unit 41 to wind up the obtained strand 1 around, e.g., a bobbin.

Any of the upper draw-off roll 43 and the lower draw-off roll 45 in a pair is arranged in a direction inclined with respect to the direction of drawing off the impregnated fiber material 5, and the draw-off roll 43 and the draw-off roll 45 are in different directions at an equal angle. That is, the center of rotation of the upper draw-off roll 43 and the center of rotation of the lower draw-off roll 45 cross each other in a symmetrical X shape about the axis of drawing off the impregnated fiber material 5 as viewed from above.

Next, one example of the method for the strand 1 by means of the manufacturing device 10 will be described.

(Impregnation Step)

The impregnation step is performed by the resin bath unit 27 of the manufacturing device 10. Specifically, the base material 3 supplied through the hopper 23 is kneaded by the kneading extrusion machine 25, and the base material 3 in the molten state is stored in the resin bath unit 27. The fiber material 5 is supplied from the fiber material supply units 11 to the resin bath unit 27. In the resin bath unit 27, the fiber material 5 is impregnated in the base material 3 in the molten state, and passes through the die 29 arranged at the outlet 28 such that the impregnation amount is adjusted. By such impregnation, a state in which the base material 3 is present in a clearance in each thread of the fiber material 5, at the periphery of each thread of the fiber material 5, and among the threads of the fiber material 5 is brought. The composite body (the impregnated fiber material) of the base material 3 and the fiber material 5 obtained as described above is cooled by the cooling unit 31.

(Twisting Step)

At the twisting step, the fiber material 5 impregnated in the base material 3 in the resin bath unit 27 is twisted by the twisting unit 41. Specifically, the impregnated fiber material 5 having passed through the cooling unit 31 passes through nips of the draw-off roll 43 and the draw-off roll 45 of the twisting unit 41 while the draw-off roll 43 and the draw-off roll 45 are rotating. In this manner, the impregnated (i.e., in an impregnated state) fiber material 5 is, as described above, twisted at least on the downstream side with respect to the lowermost impregnation roll (not shown) in the resin bath unit 27. The angle of inclination with respect to a draw-off direction of the draw-off roll 43 and the draw-off roll 45 is adjusted so that the number of times of twisting and the twisting angle can be adjusted. With such twisting, the thermoplastic resin component in the strand 1 can be more distributed to the outer surface side than to the center side of the strand 1 particularly in a case where the multiple fibers or one or more fiber bundles are used as the fiber material 5.

As described above, the strand configured such that the fiber material is impregnated in the base material containing the thermoplastic resin and twisted in the axial direction can be manufactured.

<Advantageous Effects>

The strand is configured such that the fibers or the fiber bundles are impregnated in the base material and is twisted, and therefore, is less buckled and exhibits excellent handleability. In addition, the strand is twisted, and therefore, the modeled object formed using the strand by the 3D printer has excellent impact strength. With the strand, the modeled object having excellent impact strength can be easily formed by the 3D printer.

Second Embodiment

Subsequently, a modeled object of the present embodiment will be described.

The modeled object of the present embodiment is a modeled object formed by a 3D printer, the modeled object including a base containing thermoplastic resin as a main component and one or more fibers or fiber bundles contained in the base and twisted along an axial direction.

(3D Printer)

The 3D printer for the modeled object of the present embodiment includes one similar to the 3D printer for the strand of the first embodiment as described above.

(Fiber or Fiber Bundle)

One or more fibers or fiber bundles in the modeled object of the present embodiment include one similar to one or more fibers or fiber bundles in the strand of the first embodiment as described above. Moreover, as described above, the fibers or the fiber bundles will be collectively referred to as a "fiber material."

(Base)

The base contains the thermoplastic resin as the main component. The base may contain the fibers or the fiber bundles inside. The thermoplastic resin includes one similar to the thermoplastic resin of the first embodiment as described above.

(Modeled Object Manufacturing Method)

The method for manufacturing the modeled object of the present embodiment includes, for example, the step of forming the modeled object by the 3D printer by using the strand of the first embodiment as a modeling material. Specifically, the method includes the step of forming the modeled object by fused deposition modeling in which the strand of the first embodiment in a thermally-plasticized state is stacked layer by layer by the 3D printer. In the modeled object, a base material is cooled and re-solidified after having been molten, and in this manner, the base is formed. The fiber material twisted as described above is present in the base.

<Advantageous Effects>

The modeled object is configured such that the fibers or the fiber bundles are contained in the base containing the thermoplastic resin as the main component and are twisted. Thus, the modeled object has excellent impact strength as described above.

Other Embodiments

Note that the present invention is not limited to the above-described embodiments.

For example, for the strand of the above-described embodiment, the composite body impregnated in the molten thermoplastic resin is twisted by the twisting unit having the pair of draw-off rolls. However, for twisting, the wind-up unit (the bobbin) configured to twist, after impregnation, the cooled composite body while winding up the composite body as described above can be also adopted. In this case, e.g., a form in which the wind-up unit has a roll configured to wind up the composite body and a support member configured to support the roll and is configured to rotate the support member together with the roll about a second center in the direction of drawing off the composite body while rotating the roll relative to the support member about a first center perpendicular to the draw-off direction such that the roll winds up the composite body can be adopted.

FIG. 1 of the embodiment illustrates the form in which the multiple fibers are impregnated in the base material. In addition, a form in which one fiber is impregnated in the base material, a form in which one fiber bundle is impregnated in the base material, and a form in which multiple fiber bundles are impregnated in the base material can be also adopted.

EXAMPLES

Hereinafter, the present disclosure will be described in more detail with reference to examples, but the present invention is not limited to these examples.

For conducting study on influence of the number of times of twisting of the fiber material on the bendability of the strand and the impact strength of the modeled object, first to fourth examples and a first comparative example described below were prepared.

First Example

One carbon fiber bundle with 12000 tex was used as the fiber material. Polypropylene was used as the thermoplastic resin as the base. Using the manufacturing device illustrated in FIG. 2, the composite body was twisted such that the twisting angle is 5° and the number of times of twisting per meter is 22/m as shown in Table 1 in such a manner that the fiber material is impregnated in the thermoplastic resin in the molten state and the composite body is twisted while the angle of inclination with respect to the draw-off direction of the pair of draw-off rolls of the twisting unit is being adjusted. In this manner, a strand of the first example was formed. The average diameter (the outer diameter) of the obtained strand was 1.5 mm.

Two to Fourth Examples, First Comparative Example

Strands of the second to fourth examples and the first comparative example were formed in a manner similar to that of the first example, except that the angle of inclination with respect to the draw-off direction of the pair of draw-off rolls is changed such that the twisting angles and the numbers of times of twisting as shown in Table 1 are provided. The average diameter (the outer diameter) of any of the strands of the second to fourth examples and the first comparative example was 1.5 mm.

(Evaluation of Windability (Bendability) Around Cylinder)

The maximum diameters that the obtained strands of the first to fourth examples and the first comparative example can be wound without buckling when being wound around cylinders with different diameters were measured. Results are shown in Table 1. In Table 1, in a case where the strand could be wound without bending, such a case is indicated by "G" as favorable. In a case where bending has occurred upon winding, such a case is indicated by "Bent." Moreover, a case where winding around the cylinder could be performed is indicated by "Windable," and a case where winding around a paper tube could not be performed is indicated by "Unwindable."

(Evaluation of Impact-Resistant Characteristics)

Each of the obtained strands of the second to fourth examples and the first comparative example was cut in a length of 100 mm, and was taken as a measurement sample. For each of the second to fourth examples and the first comparative example, multiple measurement samples were spread in a metal frame with an inner length of 100 mm, a width of 100 mm, and a thickness of 2 mm, and a modeled object was obtained by hot press at 180° C. This represents multiple 3D print layers. The fiber content of the obtained modeled object was 50% by mass. This modeled object was cut in a width of 10 mm, and measurement by a Charpy impact test was performed. Results are shown in Table 1.

TABLE 1

|  | Twisting angle [°] | Number of times of twisting per meter in length [times/m] | Flex resistance Cylinder diameter | | | Winding around cylinder | Charpy impact strength [kJ/m$^2$] |
| --- | --- | --- | --- | --- | --- | --- | --- |
|  |  |  | 200 mm | 250 mm | 800 mm |  |  |
| First example | 5 | 22 | Bent | Bent | Bent | Windable | Not measured |
| Second example | 10 | 43 | Bent | G | G | Windable | 98 |
| Third example | 20 | 93 | G | G | G | Windable | 98 |
| Fourth example | 30 | 142 | G | G | G | Windable | 83 |
| First comparative example | 0 | 0 | Bent | Bent | Bent | Unwindable | 92 |

As shown in Table 1, the fiber material is impregnated in the base material containing the thermoplastic resin as the main component and is twisted, and therefore, the strand which can form the modeled object with excellent impact strength without buckling is obtained. Note that in the case of using the first comparative example, the strand is cut upon use as described above so that the layers can be stacked on each other to form the modeled object, but due to poor bendability of the strand, it is difficult to form the modeled object by continuous stacking of the layers.

As described above, the strand includes the base material containing the thermoplastic resin as the main component and one or more fibers or fiber bundles impregnated in the base material and extending in the axial direction, and is twisted along the axial direction. Thus, the strand is less buckled, and exhibits excellent handleability. In addition, the strand is twisted, and therefore, the modeled object formed using the strand by the 3D printer has excellent impact strength. Thus, the modeled object with excellent impact strength can be easily formed from the strand by the 3D printer. The modeled object includes the base containing the thermoplastic resin as the main component and one or more fibers or fiber bundles contained in the base and twisted along the axial direction, and therefore, has excellent impact strength. Thus, the modeled object is formed using the strand so that modeling expected to be demanded in the future for forming complicated and delicate modeled object with excellent impact strength by the 3D printer can be executed.

The invention claimed is:

1. A strand used as a raw modeling material for a 3D printer, comprising:
   a base material containing thermoplastic resin as a main component; and
   one or more fibers or fiber bundles impregnated in the base material and extending in an axial direction,
   wherein the strand is twisted along the axial direction, and
   wherein an angle of the twisting with respect to the axial direction is equal to or greater than 3° and equal to or less than 50°.

2. The strand according to claim 1,
   wherein the number of times of twisting per meter in length in the axial direction is equal to or greater than 10/m and equal to or less than 200/m.

3. The strand according to claim 1,
   wherein the fibers or the fiber bundles contain a carbon fiber.

4. A modeled object formed by a 3D printer, comprising:
   a base containing thermoplastic resin as a main component; and
   one or more fibers or fiber bundles contained in the base and twisted along an axial direction,
   wherein an angle of the twisting with respect to the axial direction is equal to or greater than 3° and equal to or less than 50°.

* * * * *